United States Patent
Edery et al.

(10) Patent No.: US 7,008,583 B1
(45) Date of Patent: Mar. 7, 2006

(54) PROCESS OF INLAYING A DESIGN IN A FIBERGLASS ARTICLE

(76) Inventors: Moises Edery, 1920 NE. 187 Ave., Miami, FL (US) 33179; Saul Ariel Raschkovan, 1753 NW. 19 Ter., Apt. 4, Miami, FL (US) 33128

( * ) Notice: Subject to any disclaimer, the term of this patent is extended or adjusted under 35 U.S.C. 154(b) by 309 days.

(21) Appl. No.: 10/424,936

(22) Filed: Apr. 29, 2003

(51) Int. Cl.
*B29C 39/12* (2006.01)

(52) U.S. Cl. .................. 264/139; 264/162; 264/246; 264/247; 264/255; 264/DIG. 57

(58) Field of Classification Search ............... 264/139, 264/162, 246, 247, 255
See application file for complete search history.

(56) References Cited

U.S. PATENT DOCUMENTS

| | | | | |
|---|---|---|---|---|
| 4,879,152 A | * | 11/1989 | Green | 428/73 |
| 5,296,340 A | * | 3/1994 | Tsukada et al. | 430/394 |
| 6,403,004 B1 | | 6/2002 | Stecker | 264/139 |

* cited by examiner

*Primary Examiner*—Stefan Staicovici
(74) *Attorney, Agent, or Firm*—Jesus Sanchelima

(57) ABSTRACT

A process of inlaying a design in a fiberglass article to provide a decorative article of manufacture. The process comprises applying a first lamina of releasing agent into a mold. Then forming a second lamina of clear gel coat on the first lamina and allowing it to dry. Then forming a third lamina of transparent polyester resin on the second lamina and submerging the design into the third lamina before the third lamina is dry. Then removing air bubbles from the design and the third lamina and allowing the third lamina to dry. Then applying a fourth lamina of curable resin on the third lamina, whereby the fourth lamina is formed substantially from fiberglass of a white pigmentation, and allowing it to dry. Lastly, removing the mold from the first, second, third, and fourth laminas.

17 Claims, 1 Drawing Sheet

PROCESS OF INLAYING A DESIGN IN A FIBERGLASS ARTICLE

BACKGROUND OF THE INVENTION

1. Field of the Invention

The present invention relates to manufacturing fiberglass articles, and more particularly, to a manufacturing process that includes inlaying of designs in fiberglass articles.

2. Description of the Related Art

Many processes to develop fiberglass articles have been designed in the past. None of them, however, include a process of inlaying a design in a fiberglass article to provide a decorative article of manufacture. In the preferred embodiment, the decorative article of manufacture is substantially planar. At least one lamina of the decorative article serves as a background and includes resin having white pigmentation. The white pigmentation is for optimal optical reflection, thereby maintaining the visual integrity of the design when inlayed and set within the fiberglass article.

Applicant believes that the closest reference corresponds to U.S. Pat. No. 6,403,004 issued to Stecker for process for making a multi-layered solid surface article. However, it differs from the present invention because Stecker teaches a process for producing a decorative article having a face layer of multiple laminae. A first curable resin is formed into a first lamina having a face layer with a relief and a substantially planar back layer. The first resin is cured and then a second curable resin is applied to the face layer of the first lamina. The second resin is then cured to produce a second lamina and the first and second laminae are then sanded to provide a decorative article of manufacture having a substantially planar face layer.

Other patents describing the closest subject matter provide for a number of more or less complicated features that fail to solve the problem in an efficient and economical way. None of these patents suggest the novel features of the present invention.

SUMMARY OF THE INVENTION

A process for inlaying a design in an article, the process comprising applying a first lamina of releasing agent into a mold. Forming a second lamina of clear gel coat on the first lamina. The second lamina formed substantially from a transparent resin and catalyst. Curing the second lamina. Forming a third lamina of the transparent resin and catalyst on the second lamina. Submerging the design into the third lamina before the third lamina is dry. Removing air bubbles from the design and the third lamina. Curing the third lamina. Applying a fourth lamina of the transparent resin and catalyst on the third lamina. The fourth lamina formed substantially from fiberglass including white pigmentation. Curing the fourth lamina, and removing the mold from the first, second, third, and fourth laminas to provide a decorative article of manufacture.

In the preferred embodiment, the article is made of fiberglass. Therefore, a process for inlaying a design in a fiberglass article comprises applying a first lamina of releasing agent into a mold. Forming a second lamina of clear gel coat on the first lamina. The second lamina is formed substantially from a transparent polyester resin and catalyst. The second lamina is allowed to dry. Forming a third lamina of transparent polyester resin on the second lamina and submerging the design into the third lamina before the third lamina is dry. Removing air bubbles from the design and the third lamina and allowing it to dry. Applying a fourth lamina of curable resin on the third lamina. The fourth lamina is formed substantially from fiberglass including white pigmentation. The fourth lamina is allowed to dry, and removing the mold from the first, second, third, and fourth laminas to provide a decorative article of manufacture.

In the preferred embodiment, the first lamina is selected from the group consisting of silicones, waxes, zinc stearate, polyvinyl alcohol, and blends and mixtures thereof.

In the preferred embodiment, the second lamina is selected from the group consisting of unsaturated polyesters, acrylics, epoxies, phenolics and polyurethanes, and blends and mixtures thereof. However, any resin being transparent and having similar qualities to the previously mentioned will work as well.

In the preferred embodiment, the third lamina is selected from the group consisting of unsaturated polyesters, acrylics, epoxies, phenolics and polyurethanes, and blends and mixtures thereof. However, any resin being transparent and having similar qualities to the previously mentioned will work as well.

In the preferred embodiment, the fourth lamina is selected from the group consisting of unsaturated polyesters, acrylics, epoxies, phenolics and polyurethanes, and blends and mixtures thereof. However, any resin being transparent and having similar qualities to the previously mentioned will work as well.

The second, third, and fourth lamina may be the same resin. Curing of the second lamina may include heating the second lamina to a temperature of about 70 degree and 90 degree Centigrade. Curing of the third lamina may include heating the third lamina to a temperature of about 70 degree and 90 degree Centigrade. Curing of the fourth lamina may include heating the fourth lamina to a temperature of about 70 degree and 90 degree Centigrade.

The fourth lamina has the white pigmentation for optimal optical reflection to maintain visual integrity of the design when inlayed and set within the fiberglass article.

It is therefor one of the main objects of the present invention to provide a process of inlaying a design in a fiberglass article, wherein at least one background lamina has white pigmentation for optimal optical reflection to maintain the visual integrity of the design, when inlayed and set within the fiberglass article.

It is another object of this invention to provide a process of inlaying a design in a fiberglass article to provide a decorative article of manufacture.

It is yet another object of this invention to provide such a process that is inexpensive to develop and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE PREFERRED EMBODIMENT

Figure 1:
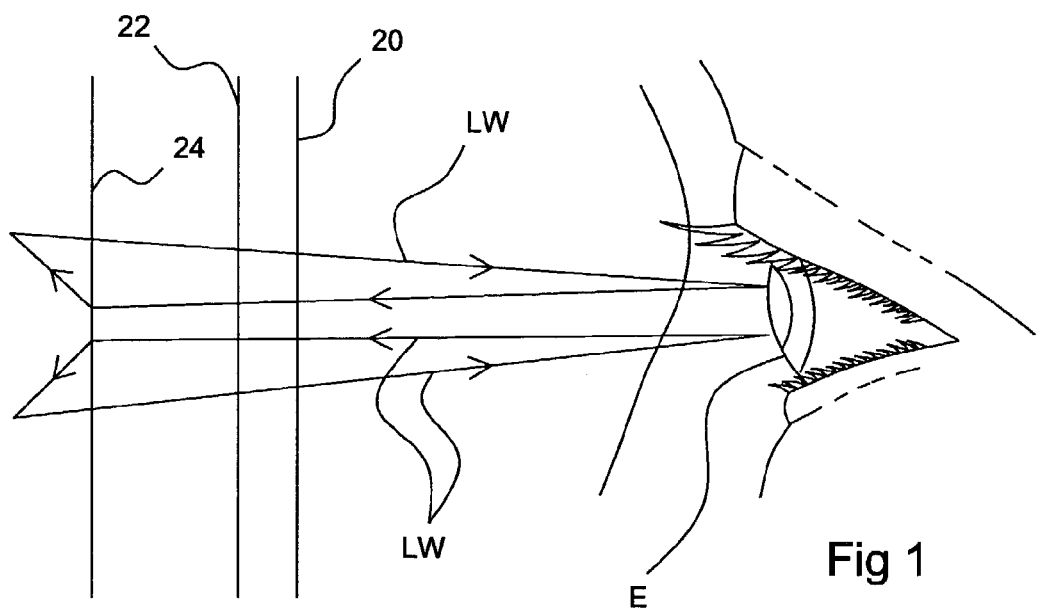
FIG. 1 is an illustration of light waves reflecting from a fiberglass article not having a background lamina with white pigmentation.

The present invention for a manufacturing process that includes inlaying a design in a fiberglass article comprises:
(A) applying a first lamina of releasing agent into a mold;
(B) forming a second lamina of clear gel coat on said first lamina, said second lamina formed substantially from a transparent polyester resin and catalyst;
(C) curing said second lamina;
(D) forming a third lamina of transparent polyester resin on said second lamina;
(E) submerging said design into said third lamina before said third lamina is dry;
(F) removing air bubbles from said design and said third lamina;
(G) curing said third lamina;
(H) applying a fourth lamina of curable resin on said third lamina, said fourth lamina formed substantially from fiberglass including white pigmentation;
(I) curing said fourth lamina;
(J) removing said mold from said first, second, third, and fourth laminas to provide a decorative article of manufacture.

Step A) of the method includes, applying a first lamina of releasing agent into a mold. In the preferred embodiment, a mold has a base and continuous side edges to define an area into which a releasing agent may be applied. The mold may be square, rectangular, circular or triangular; however, as would be understood by those having skill in the art, other sizes and shapes may be utilized. The mold may be for a tabletop as an example, whereby the design would be visible on the tabletop when the process is completed. The mold may also be shaped for a variety of decorative articles of manufacture, such as, but not limited to menu boards, poster boards, sidewalls, and furniture such as desks and cabinets. Preferably, the mold pattern is aesthetically pleasing. In addition, the base of the mold is recessed to allow for a plurality of laminas to be developed within.

The mold may be made from a variety of materials such as aluminum, polyethylene, silicone or fiberglass composite and may be cast or machined to produce a decorative pattern, as would be known to those skilled in the art. The mold including the base may be designed and created under computer control. For patterns and designs that do not lend themselves to computer assisted machining, traditional mold and pattern making methods can be used. Sculpting and texture transfers to silicone molds are examples.

The releasing agent can be a silicon release agent, a wax in the carnauba wax family, "TEFLON" (a trademark of the E.I. DuPont de Nemours Company, Wilmington, Del.), zinc stearate, polyvinyl alcohol (PVA), or any similar material that will function as a release agent for the particular resin material being used to create the other laminas.

Materials should be stored and used in a warm environment, in the preferred embodiment, approximately 20 degrees Centigrade. The releasing agent may be sprayed into the mold. Spraying should be done in a well-ventilated area. The worker should wear an independent air supplied hood or NIOSH approved breathing mask, latex gloves and long sleeve garments to minimize skin contact.

As previously mentioned, the releasing agent is necessary to facilitate demolding. A liberal coat of releasing agent should be applied into all surfaces of the mold. To ensure thorough coverage, lightly brushing the releasing agent with a soft brush over all surfaces is recommended. In the preferred embodiment, follow with a light mist coating. The releasing agent may also be applied with brush and/or other common forms of application typical in the art.

Step B) of the method includes forming a second lamina of clear gel coat on the first lamina. The second lamina is formed substantially from a transparent polyester resin and catalyst.

Gel coat is defined as a quick-setting transparent polyester resin applied to the surface of a mold and gelled before lay-up. The gel coat becomes an integral part of the finished laminate, and is usually used to improve surface appearance and performance. In the preferred embodiment, the gel coat is activated by catalyst. The recommended catalyst range for proper cure is 1.5% to 2.5%, with 2.0% being ideal and in the preferred embodiment methyl ethyl ketone peroxide is used as the catalyst. The working time at a temperature of 25 degrees Centigrade is approximately 20 minutes.

Materials should be stored and used in a warm environment, in the preferred embodiment, approximately 20 degrees Centigrade. The gel coat may be sprayed over the first lamina. Spraying should be done in a well-ventilated area. The worker should wear an independent air supplied hood or NIOSH approved breathing mask, latex gloves and long sleeve garments to minimize skin contact.

A liberal coat of gel coat should be applied over the first lamina. In the preferred embodiment, follow with a light mist coating. The gel coat may also be applied with brush and/or other common forms of application typical in the art.

Step C) of the method includes curing the second lamina. Curing may occur at room temperature, for example between about 15 degree Centigrade and 38 degree Centigrade, or at elevated temperatures, for example, between about 70 degree Centigrade and 90 degree Centigrade. The specific curing temperature and curing time may vary and will depend upon the particular resin and catalyst, information of is well known in the art. After sufficient curing time, the clear gel coat is substantially fully polymerized resulting in the second lamina.

Step D) of the method includes forming a third lamina of transparent polyester resin on the second lamina. Materials should be stored and used in a warm environment, in the preferred embodiment, approximately 20 degrees Centigrade. The transparent polyester resin may be sprayed over the second lamina. Spraying should be done in a well-ventilated area. The worker should wear an independent air supplied hood or NIOSH approved breathing mask, latex gloves and long sleeve garments to minimize skin contact.

A liberal coat of transparent polyester resin should be applied over the second lamina. The transparent polyester resin may also be applied with brush and/or other common forms of application typical in the art. The recommended catalyst range for proper cure is 1.5% to 2.5%, with 2.0% being ideal, and in the preferred embodiment methyl ethyl ketone peroxide is used as the catalyst.

Step E) of the method includes submerging said design into the third lamina before said third lamina is dry. Submersion of the design may be accomplished with suitable tools to protect from hazards of the materials used.

Step F) of the method includes removing air bubbles from the design and the third lamina. This step may be accomplished with a squeegee by working air bubbles from under the design outwardly to its extremities and from the third lamina.

Step G) of the method includes curing said third lamina. Curing may occur at room temperature, for example between about 15 degree Centigrade and 38 degree Centigrade, or at elevated temperatures, for example, between about 70 degree Centigrade and 90 degree Centigrade. The specific curing temperature and curing time may vary and will depend upon the particular resin and catalyst, information of is well known in the art. After sufficient curing time, the transparent polyester resin coat is substantially fully polymerized resulting in the third lamina.

Step H) of the method includes applying a fourth lamina of curable resin on the third lamina. The fourth lamina is formed substantially from fiberglass including white pigmentation. The preparation of the curable resin is well known in the art and generally involves mixing the resin with various filler materials, fiber reinforcement, appropriate catalysts, and white pigment materials; referred to as a resin system. Preferred filler materials, such as alumina, trihydrate and/or glass fibers, are selected to impart desired properties to the resin. Preferably, the mixing of the resin for use in the above process includes mixing under vacuum to remove any air entrapped by the mixing process.

The resin system can also include various additives commonly employed in resin compositions such as fillers, thixotropic agents, chemical thickening agents, casting part release agents, low profile additives, fiber reinforcement, and other additives for imparting desirable properties such as hardness, flame retardancy, aesthetic appearance, smoothness, clarity and the like. Fibers added may include glass, carbon, metals, and the like. Additionally, resins may be selected having a degree of translucency allowing the colors of the inlayed design to be visible.

Exemplary fillers can include, among others, alumina trihydrate, quartz powder, marble powder, crushed silica, calcium carbonate, clay, glass fibers, powdered metals, mixtures thereof and other mineral and inorganic particulates that contribute to the aesthetics of the final article. The fillers are used in amounts of about 20 to about 300 percent by weight of resin. Other additives can include flame-retardants, antioxidants, inhibitors (e.g., hydroquinone and benzoquinone), UV radiation absorbers and the like.

The fourth lamina includes the white pigmentation for optimal optical reflection, to maintain visual integrity of the design when inlayed and set within the fiberglass article. More specifically, the fourth lamina serves as a background for the design that is inlayed in Step E). With a white background, light-waves reflect therefrom enabling the visual integrity of the design to remain as it existed before the design was submerged into the third lamina. Furthermore, the white background does not allow the light-waves to penetrate therethrough and refract, therefore acting as an optical brake. Graphics, colors, lines, lettering, and in essence the visual illustrations in the design, remain sharp and do not become blurry. In the preferred embodiment, white pigmentation is used, the purer the white, the better result.

As seen in FIG. 1, the optical reflection of light-waves LW as seen by eye E, is from a point beyond lamina 24, thereby blurring and/or distorting the visual integrity of the design when inlayed and set within the fiberglass article. Light-waves LW travel through lamina 20, design 22, and reflect from beyond lamina 24.

Figure 2:
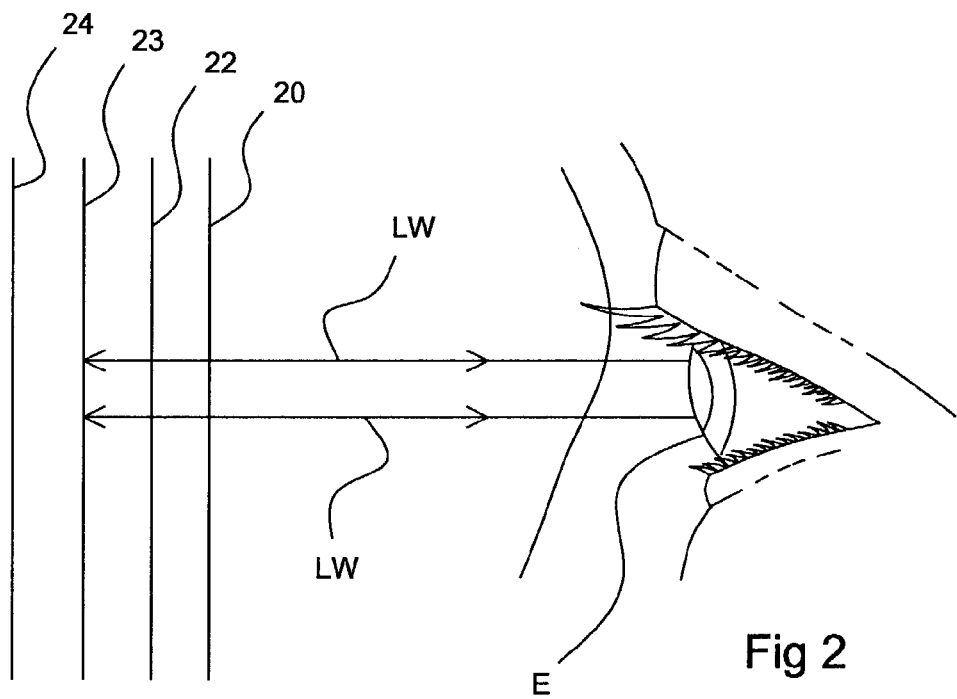
FIG. 2 is an illustration of light waves reflecting from a fiberglass article having a background lamina with white pigmentation.

As seen in FIG. 2, at least one lamina 23 of the decorative article serves as a background and includes resin having white pigmentation. The white pigmentation is for optimal optical reflection of light-waves LW as seen by eye E, thereby maintaining the visual integrity of the design when inlayed and set within the fiberglass article. Light-waves LW travel through second lamina 20, design 22, and reflect from fourth lamina 23. Also seen is an additional lamina 24, for reinforcement if necessary.

As previously mentioned, materials should be stored and used in a warm environment, in the preferred embodiment, approximately 20 degrees Centigrade. The curable resin may be sprayed over the third lamina. As previously mentioned, spraying should be done in a well-ventilated area. The worker should wear an independent air supplied hood or NIOSH approved breathing mask, latex gloves and long sleeve garments to minimize skin contact.

A liberal coat of curable resin should be applied over the third lamina. The curable resin may also be applied with brush and/or other common forms of application typical in the art. The recommended catalyst range for proper cure is 1.5% to 2.5%, with 2.0% being ideal, and in the preferred embodiment methyl ethyl ketone peroxide is used as the catalyst.

Step I) of the method includes curing said fourth lamina. Curing may occur at room temperature, for example between about 15 degree Centigrade and 38 degree Centigrade, or at elevated temperatures, for example, between about 70 degree Centigrade and 90 degree Centigrade. The specific curing temperature and curing time may vary and will depend upon the particular fiberglass, information of is well known in the art. After sufficient curing time, the fiberglass is substantially fully polymerized resulting in the fourth lamina.

Step J) of the method includes removing the mold from said first, second, third, and fourth laminas to provide a decorative article of manufacture. Proper use of the releasing agent in step A) will simplify this step.

Optionally, reinforcement laminas may be formed upon the fourth lamina for additional stability.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A process for inlaying a design in an article, the process comprising:
   (A) applying a first lamina of releasing agent into a mold;
   (B) forming a second lamina of clear gel coat on said first lamina, said second lamina formed substantially from a transparent resin and catalyst;
   (C) curing said second lamina;
   (D) forming a third lamina of said transparent resin and catalyst on said second lamina;
   (E) submerging said design into said third lamina before said third lamina is dry;
   (F) removing air bubbles from said design and said third lamina;
   (G) curing said third lamina;
   (H) applying a fourth lamina of said transparent resin and catalyst on said third lamina, said fourth lamina formed substantially from fiberglass including white pigmentation, said fourth lamina has said white pigmentation for optimal optical reflection to maintain visual integrity of said design when inlayed and set within said fiberglass article forming a background for said design;
   (I) curing said fourth lamina;
   (J) removing said mold from said first, second, third, and fourth laminas to provide a decorative article of manufacture.

2. A process for inlaying a design in a fiberglass article, the process comprising:
   (A) applying a first lamina of releasing agent into a mold;

(B) forming a second lamina of clear gel coat on said first lamina, said second lamina formed substantially from a transparent polyester resin and catalyst;
(C) curing said second lamina;
(D) forming a third lamina of transparent polyester resin on said second lamina;
(E) submerging said design into said third lamina before said third lamina is dry;
(F) removing air bubbles from said design and said third lamina;
(G) curing said third lamina;
(H) applying a fourth lamina of curable resin on said third lamina, said fourth lamina formed substantially from fiberglass including white pigmentation, said fourth lamina has said white pigmentation for optimal optical reflection to maintain visual integrity of said design when inlayed and set within said fiberglass article forming a background for said design;
(I) curing said fourth lamina;
(J) removing said mold from said first, second, third, and fourth laminas to provide a decorative article of manufacture.

3. The process according to claim 2, further characterized in that said first lamina is selected from the group consisting of silicones, waxes, zinc stearate, and polyvinyl alcohol, and blends and mixtures thereof.

4. The process according to claim 2, further characterized in that said second lamina is selected from the group consisting of unsaturated polyesters, acrylics, epoxies, phenolics and polyurethanes, and blends and mixtures thereof.

5. The process according to claim 2, further characterized in that said third lamina is selected from the group consisting of unsaturated polyesters, acrylics, epoxies, phenolics and polyurethanes, and blends and mixtures thereof.

6. The process according to claim 2, further characterized in that said fourth lamina is selected from the group consisting of unsaturated polyesters, acrylics, epoxies, phenolics and polyurethanes, and blends and mixtures thereof.

7. The process according to claim 2, further characterized in that said second, third, and fourth lamina are the same resin.

8. The process according to claim 2, further characterized in that said step (C) includes heating said second lamina to a temperature of about 70 degree and 90 degree Centigrade.

9. The process according to claim 2, further characterized in that said step (G) includes heating said third lamina to a temperature of about 70 degree and 90 degree Centigrade.

10. The process according to claim 2, further characterized in that said step (I) includes heating, said fourth lamina to a temperature of about 70 degree and 90 degree Centigrade.

11. A process for inlaying a design in a fiberglass article, the process comprising:
(A) applying a first lamina of releasing agent into a mold;
(B) forming a second lamina of clear gel coat on said first lamina, said second lamina formed substantially from a transparent polyester resin and catalyst;
(C) curing said second lamina;
(D) forming a third lamina of transparent polyester resin on said second lamina;
(E) submerging said design into said third lamina before said third lamina is dry;
(F) removing air bubbles from said design and said third lamina;
(G) curing said third lamina;
(H) applying a fourth lamina of curable resin on said third lamina, said fourth lamina formed substantially from fiberglass including white pigmentation, said fourth lamina has said white pigmentation for optimal optical reflection to maintain visual integrity of said design when inlayed and set within said fiberglass article forming a background for said design;
(I) curing said fourth lamina;
(J) removing said mold from said first, second, third, and fourth laminas to provide a decorative article of manufacture being substantially planar.

12. The process according to claim 11, further characterized in that said first lamina is selected from the group consisting of silicones, waxes, zinc stearate, and polyvinyl alcohol, and blends and mixtures thereof.

13. The process according to claim 12, further characterized in that said second lamina is selected from the group consisting of unsaturated polyesters, acrylics, epoxies, phenolics and polyurethanes, and blends and mixtures thereof.

14. The process according to claim 13, further characterized in that said third lamina is selected from the group consisting of unsaturated polyesters, acrylics, epoxies, phenolics and polyurethanes, and blends and mixtures thereof.

15. The process according to claim 14, further characterized in that said fourth lamina is selected from the group consisting of unsaturated polyesters, acrylics, epoxies, phenolics and polyurethanes, and blends and mixtures thereof.

16. The process according to claim 15, further characterized in that said second, third, and fourth lamina are the same resin.

17. The process according to claim 16, further characterized in that said step (C) includes heating said second, third, and fourth laminas to a temperature of about 70 degree and 90 degree Centigrade.

* * * * *